United States Patent [19]

Beitz

[11] Patent Number: 4,555,318

[45] Date of Patent: Nov. 26, 1985

[54] REMOVAL OF FLUORIDE IMPURITIES FROM UF$_6$ GAS

[75] Inventor: James V. Beitz, Hinsdale, Ill.

[73] Assignee: The United States of America as represented by the United States Department of Energy, Washington, D.C.

[21] Appl. No.: 568,769

[22] Filed: Jan. 6, 1984

[51] Int. Cl.$^4$ .............................................. C01G 43/06
[52] U.S. Cl. ................................ 204/157.1 R; 423/19; 423/258
[58] Field of Search ................................ 423/19, 258; 204/157.1 R

[56] References Cited

U.S. PATENT DOCUMENTS

| | | | |
|---|---|---|---|
| 3,035,894 | 5/1962 | Hobbs | 423/258 |
| 3,046,089 | 7/1962 | Steindler | 423/19 |
| 3,482,949 | 12/1969 | Trevorrow et al. | 423/19 |
| 3,708,568 | 1/1973 | Goliher et al. | 423/19 |
| 3,753,920 | 8/1973 | Anastasia et al. | 423/19 |
| 3,806,579 | 4/1974 | Carles et al. | 423/19 |
| 3,929,601 | 12/1975 | Aspry et al. | 204/157.1 R |
| 4,096,231 | 6/1978 | Ebert et al. | 423/19 |
| 4,172,114 | 10/1979 | Tsujino et al. | 423/251 |
| 4,202,861 | 5/1980 | Bourgeois et al. | 423/258 |
| 4,311,678 | 1/1982 | Jacob et al. | 423/19 |
| 4,334,883 | 6/1982 | Robinson et al. | 204/157.1 R |
| 4,364,906 | 12/1982 | Jones et al. | 423/19 |
| 4,434,139 | 2/1984 | Bacher et al. | 423/19 |

FOREIGN PATENT DOCUMENTS 2504840  8/1976  Fed. Rep. of Germany .

OTHER PUBLICATIONS

Bacher et al., "Gmelin Handbuch der Anorganischen Chemie", Uran Erganzungsbend C8, pp. 62–70, Springer–Verlag, (1980), Berlin.

*Primary Examiner*—Edward A. Miller
*Attorney, Agent, or Firm*—James W. Weinberger; William Lohff; Judson R. Hightower

[57] ABSTRACT

A method of purifying a UF$_6$ gas stream containing one or more metal fluoride impurities composed of a transuranic metal, transition metal or mixtures thereof, is carried out by contacting the gas stream with a bed of UF$_5$ in a reaction vessel under conditions where at least one impurity reacts with the UF$_5$ to form a nongaseous product and a treated gas stream, and removing the treated gas stream from contact with the bed. The nongaseous products are subsequently removed in a reaction with an active fluorine affording agent to form a gaseous impurity which is removed from the reaction vessel. The bed of UF$_5$ is formed by the reduction of UF$_6$ in the presence of UV light. One embodiment of the reaction vessel includes a plurality of UV light sources as tubes on which UF$_5$ is formed.

11 Claims, 2 Drawing Figures

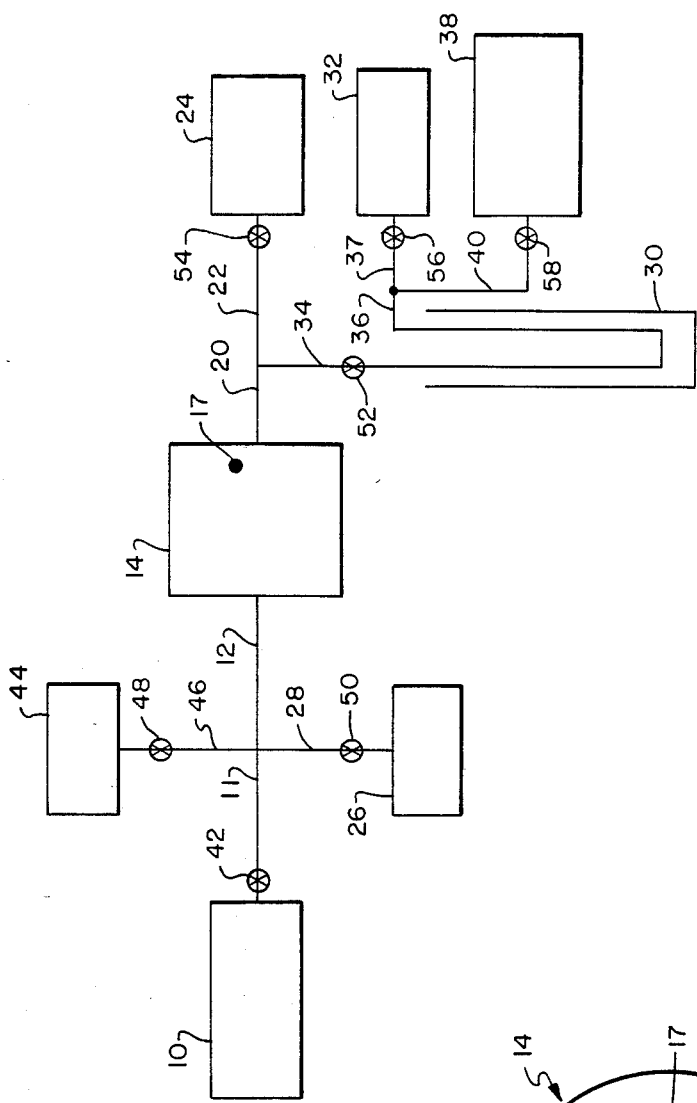
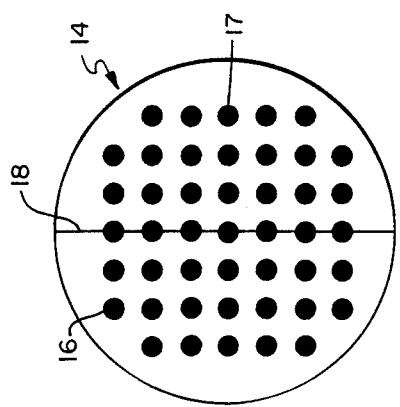
FIG. 1
FIG. 2

REMOVAL OF FLUORIDE IMPURITIES FROM UF$_6$ GAS

CONTRACTUAL ORIGIN OF THE INVENTION

The U.S. Government has rights in this invention pursuant to Contract No. W-31-109-ENG-38 between the U.S. Department of Energy and the University of Chicago representing Argonne National Laboratory.

BACKGROUND OF THE INVENTION

This invention relates to the removal of fluoride impurities from a uranium hexafluoride gas stream and more particularly to the removal of fluoride impurities from a uranium hexafluoride gas stream by contacting the gas stream with a bed of uranium pentafluoride.

Previous methods for the removal of fluoride impurities from a uranium feedstock based on spent nuclear reactor fuel have involved a variety of techniques. In some instances, the feedstock prior to the formation of UF$_6$ has been contacted with an aqueous solution. This has resulted in an increase in the volume of radioactive waste. In other instances, alkali metal fluorides in sorption beds have been used to separate the fluoride impurities from UF$_6$. This has also resulted in an increase in radioactive waste products. In still other instances, as disclosed in U.S. Pat. No. 4,364,906, CaCO$_3$ has been used as a trapping agent to purify the uranium gas stream. Other patents of interest are U.S. Pat. No. 3,806,579 involving distillation of UF$_6$ and U.S. Pat. No. 4,311,678 involving the use of a brominating agent. While these techniques have provided useful results, they have not been entirely satisfactory.

Accordingly, one object of this invention is the purification of UF$_6$ by another method or technique. A second object of the invention is the purification of UF$_6$ without an increase in volume of waste products. Another object of the invention is the purification of UF$_6$ by which the fluoride impurities are removed from the UF$_6$ gas stream. An additional object of the invention is the purification of UF$_6$ in which impurities trapped on a bed are recovered apart from UF$_6$. These and other objects will become apparent from the following detailed description. A further object of the invention is the purification of UF$_6$ by the use of a bed of reactive material which may be regenerated.

SUMMARY OF THE INVENTION

Briefly, the invention involves the use of a bed of UF$_5$ as a reactive medium for converting at least a portion of the fluoride impurities in the gas stream to nongaseous products retained on the bed. The treated gas stream is subsequently removed from contact with the bed. In one embodiment, the method further includes the regeneration of the bed by contact with a mixture of a reducing agent such as CO and UF$_6$ under exposure to an energy source in the ultraviolet range. In a second embodiment, the method includes removal of the impurities from the bed by contact with an active fluorine-affording agent such as F$_2$ in the presence of ultraviolet light to form gaseous impurities apart from the purified UF$_6$ gas stream.

BRIEF DESCRIPTION OF THE DRAWINGS

In the drawings:

FIG. 1 is a schematic of one embodiment of the invention.

FIG. 2 is an interior view of a packed tube reactor of FIG. 1.

DETAILED DESCRIPTION OF THE PREFERRED EMBODIMENT

In the processing of uranium feedstocks to produce uranium hexafluoride, one and more and usually several, impurities are present which upon fluorination of the feedstock can form fluorides with volatilities similar to that of uranium hexafluoride. As an illustration, feedstock consisting of spent commercial reactor fuel rods contains the transuranic elements Np, Pu and Am as well as the transition elements Tc, Rh and Ru. The transuranic impurities typically constitute about 0.95 wt. % on a metals basis of the spent fuel element and the listed transition elements constitute about 0.38 wt. %. The uranium is usually present at a level of about 96 wt. %. Uranium feedstock from natural ores mined in the western United States contains the transition element V at levels typically ranging from 0.01 to 2.0 wt. %.

The invention involves the reactivity of these gaseous fluoride impurities with solid UF$_5$ to convert the gaseous impurities to liquid and/or solid impurities which are retained on the bed associated with the UF$_5$. In the method, a portion of the UF$_5$ on the bed is converted to gaseous UF$_6$. The method involves contact of the UF$_6$ gas stream containing below about 50 wt. % and more usually a small amount (i.e., less than about 5 wt. %) of the gaseous impurities with a bed of UF$_5$ at a temperature and time sufficient to react at least a portion of the impurities with UF$_5$ and form nongaseous products retained on the bed. Usually, the temperature is in the range of 0° to 200° C. with times in the order of 1 second to 1,000,000 seconds. Preferably, the temperature is about 25° to 75° C. and the time in the order of 10 to 1000 seconds (about 17 minutes).

Subsequent removal of the nongaseous products is carried out by contacting the nongaseous products retained on the bed with one or more chemical or photochemical fluorinating agents to form gaseous impurities. Much or all of the UF$_5$ solid will be converted to UF$_6$ gas. Chemical fluorinating agents include but are not restricted to IF$_7$ as disclosed in Ger. Offen. No. 2,504,840 and may include BrF$_3$ or ClF$_3$. These chemical fluorinating agents can be employed at temperatures in the order of 0°–500° C. and preferably 0°–80° C. In the range of 80°–500° C., weaker fluorinating agents may be used chemically. Photochemical fluorinating agents include but are not restricted to F$_2$ or ClF. Photochemical fluorinating agents must be used with an energy source in the ultraviolet range. Usually the products contain some of the original gaseous impurities. Times are in the order of 100 to 10,000 seconds (about 3 hours).

Economical removal of impurities to produce UF$_6$ of acceptable quality for use in gaseous diffusion plants may require cascading several packed tube reactor systems in series. Removal of impurities up to a level 60 to 95% can be achieved per reactor stage and removal levels approaching 100% can be achieved via cascading reactors. Cascading reactors will also enable switching reactors out of the process during the recovery of impurities or regeneration of the bed.

Regeneration of the reactive bed is carried out by contacting the bed with a mixture of UF$_6$ and a reducing agent such as CO to form a UF$_5$ deposit. Various chemical and photochemical methods for producing UF$_5$(s) have been disclosed by W. Bacher and E. Jacob (Gmelin Handbuch der Anorganishcen Chemie, Uran Ergänzungsbend C8; C. Keller and R. Keim editors, Springer-Verlag, Berlin, 1980., pages 62 through 70). Usually, temperatures and times are about 25°-50° C. and 100-1000 seconds.

One embodiment of the invention is illustrated in FIG. 1 with FIG. 2 providing a view of a packed tube reactor. As illustrated, impure $UF_6$ containing one or more fluoride impurities of transuranic and/or transition metals is fed from source 10 via lines 11-12 to packed tube reactor 14. A representative construction of reactor 14 is provided in FIG. 2 and shows a plurality of tubes 16 on which $UF_5$ has been deposited to provide a dispersed surface area of $UF_5$ for contact with the impurities. During the contact of the impurities in $UF_6$ with $UF_5$, the impurities are trapped as lower valent, nongaseous fluorides. $UF_6(g)$ may be generated during the exposure of the impurities to $UF_5$.

As illustrated in FIG. 2, reactor 14 may include one or more baffles 18 to provide a plurality of contact stages depending on the volume of $UF_6$ being treated, the size of reactor 14 and the degree of impurity recovery desired. The treated $UF_6$ is removed via lines 20-22 and transferred to storage 24.

In some instances, $UF_5$ in reactor 14 is provided by the reduction of $UF_6$ to $UF_5$ with a reducing agent such as CO. As illustrated, $UF_6$ from reservoir 10 (via lines 11-12) and CO from reservoir 26 (via lines 28 and 12) are admitted to the packed tube reactor 14. Ultraviolet light sources in 17 which typically are low pressure mercury arc lamps, are turned on resulting in photochemical production of $UF_5(s)$ via the reaction:

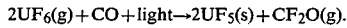
$$2UF_6(g) + CO + \text{light} \rightarrow 2UF_5(s) + CF_2O(g).$$

Residual, unreacted, $UF_6$ and CO as well as $CF_2O$ are pumped via lines 20 and 34 into the cold trap 30 where $UF_6$ and $CF_2O$ collect. The CO is pumped off. The cold trap is warmed and $CF_2O$ collects in storage 32 via lines 36-37. Further warming of the cold trap distills the $UF_6$ into storage 38 via lines 36 and 40.

Periodically, the flow of impure $UF_6$ is interrupted by valve 42 so that the nongaseous impurities in reactor 14 may be removed. In this process, the impurities embedded in $UF_5(s)$ are refluorinated photochemically using $F_2(g)$ as the fluorinating agent. The $F_2(g)$ from reservoir 44 is fed via lines 46 and 12 through the reactor 14 while the ultraviolet lights are turned on. The gases leaving reactor 14 are pumped through the cold trap 30 where the volatile impurity fluorides are collected along with any regenerated $UF_6$. The $F_2(g)$ passes through cold trap 30 and is collected in storage 32. The trap 30 is warmed incrementally and fractions are collected in storage 38. Several photochemical fluorination cycles are employed each removing only a part of the impurities and/or $UF_5(s)$. The gas stream leaving reactor 30 during the initial photofluorination cycles largely contains $UF_6(g)$ and $F_2(g)$ as any gaseous impurities formed by photochemical fluorination tend to be retrapped by $UF_5(s)$. Once the $UF_5(s)$ has largely been converted to $UF_6(g)$, the gas stream leaving reactor 14 during photofluorination will primarily contain gaseous impurities and $F_2(g)$. Values 42, 48, 50, 52, 54, 56 and 58 provide a means of isolating various parts of the process to carry out the various processing steps.

The following example is provided for illustrative purposes and is not intended to be restrictive as to the scope of the invention:

EXAMPLE I

Six milligrams of $UF_5(s)$ was deposited as a thin layer along the main body of a tubular quartz sample cell which had previously been baked out under vacuum and passivated by exposure to small amounts of $UF_6(g)$. The $UF_5$ was deposited by photochemically reducing $UF_6$ using CO as a reductant and a mercury arc as a light source. The reaction products and remaining reactants were pumped out and the cell was thoroughly evacuated. The sample cell included a side arm whose temperature could be varied. Ten milligrams of $^{237}NpF_6$ was admitted to the sample cell and condensed into the side arm. The amount of $NpF_6$ in the cell corresponded to an $NpF_6$ pressure of about 28 torr. The side arm was allowed to warm, vaporizing the $NpF_6$ and bringing it into contact with the $UF_5$ film at about 22° C. The progress of the reaction of gaseous $NpF_6$ with $UF_5$ to remove gaseous $NpF_6$ and fix it as a nongaseous solid was monitored with gamma spectroscopy using a thin NaI detector located in close proximity to the $UF_5$ film and a multichannel analyzer. In the reaction $NpF_6$ was converted to a lower valent fluoride while some $UF_6$ was produced. For analysis purposes, the procedure involved reducing the side arm temperature to about −78° C. thereby condensing the remaining $NpF_6$ (and any $UF_6$ formed via reaction of $NpF_6$ with $UF_5$) into the side arm. The $^{237}Np$ activity in the $UF_5$ solid was counted using gamma spectroscopy. The side arm was then warmed to initiated another exposure cycle. The $UF_5$ solid was exposed to $NpF_6$ for about 900 seconds in the initial exposure cycle and for variable lengths of time in 11 additional exposure cycles for a total exposure time of 434,100 seconds (approximately 120 hours). An appreciable fraction, 0.286, of the total Np activity fixed in the $UF_5$ solid was deposited during the initial exposure cycle. The rate at which Np activity was fixed in the $UF_5$ solid decreased with increasing exposure time. The cell was then transferred to a vacuum line and the contents volatile at about 22° C. were collected. The collected volatile material, $UF_6$ and $NpF_6$, was subsequently hydrolyzed in acid solution and the amount of uranium in the solution was determined by isotope dilution mass spectrometry. Alpha pulse height analysis was used to determine the amount of $^{237}Np$. The total uranium in the hydrolysis solution was 0.656 mg which is equivalent to 0.971±0.001 mg of $UF_6$. An amount of $^{237}Np$ equivalent to 6.7±0.2 mg of $NpF_6$ was found. These results indicate that 3.3 mg of gaseous $NpF_6$ reacted with $UF_5(s)$ to produce a nongaseous lower valent neptunium solid and that about one third of the $NpF_6$ that reacted with the $UF_5$, produced $UF_6$ gas as a product.

The foregoing description of embodiments of the invention has been presented for purposes of illustration and description. It is not intended to be exhaustive or to limit the invention to the precise form disclosed, and obviously many modifications and variations are possible in light of the above teaching.

The embodiments of the invention in which an exclusive property or privilege is claimed are defined as follows:

1. A method of purifying a uranium hexafluoride gas stream containing a gaseous fluoride impurity of a transuranic metal, transition metal, or mixtures thereof, comprising the steps of contacting the gas stream with a bed of uranium pentafluoride at a temperature and time sufficient to react at least a portion of gaseous impurity with the uranium pentafluoride to form nongaseous product retained on the bed and thereby forming a treated gas stream, and removing the treated gas stream from contact with the bed.

2. The method of claim 1 wherein the impurity is present in an amount of less than about 50 wt. %.

3. The method of claim 1 wherein the temperature is in the order of about 25°–75° C. and the impurity is present in an amount of less than about 5 wt. %.

4. The method of claim 3 wherein the time is less than about three hours.

5. The method of claim 1 including the steps of interrupting the contacting and removing steps of claim 1 and removing at least a portion of the nongaseous product on the bed by reacting the nongaseous product on the bed with an active fluorine affording agent at a temperature and time sufficient to produce a gaseous impurity and removing the gaseous impurity from contact with the bed.

6. The method of claim 5 wherein the temperature is in the order of about 0°–500° C.

7. The method of claim 6 wherein the agent is $F_2$ in the presence of an energy source in the ultraviolet range.

8. The method of claim 6 wherein the time is less than about 3 hours.

9. The method of claim 1 including the step prior to purification of said gas stream of forming uranium pentafluoride on the bed by contacting the bed with a mixture of a reducing agent and uranium hexafluoride at a temperature and time sufficient to convert the uranium hexafluoride to uranium pentafluoride and form a deposit of said pentafluoride on the bed.

10. The method of claim 9 wherein the reducing agent is CO in the presence of an energy source in the ultraviolet range.

11. The method of claim 10 wherein the temperature is in the order of 25°–50° C.

* * * * *